Patented Oct. 23, 1951

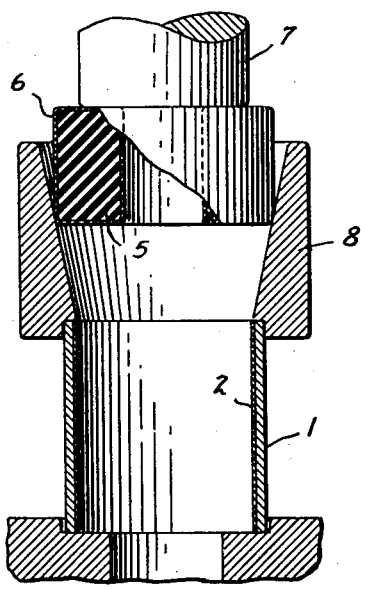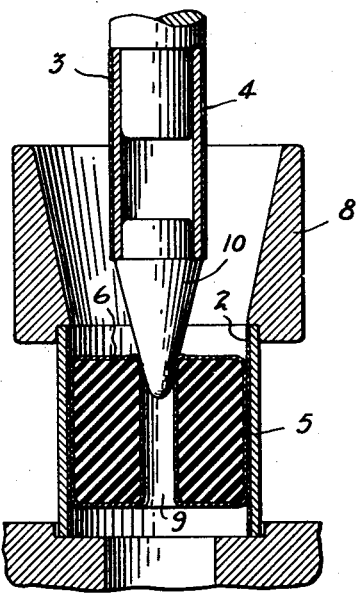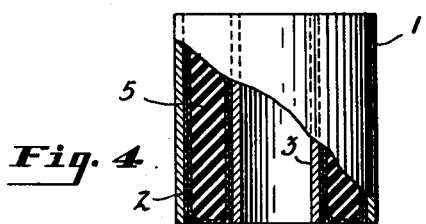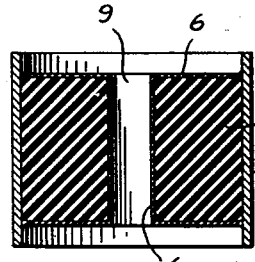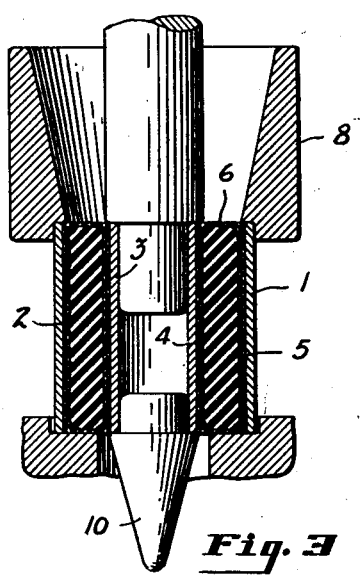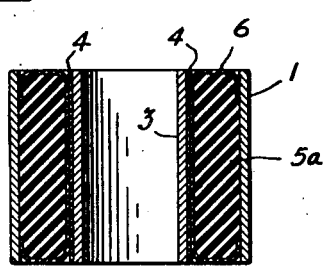

2,572,160

UNITED STATES PATENT OFFICE 2,572,160

VIBRATION ABSORBING BUSHING

John H. Kelly, Jr., and Rosalind M. Glassco, Wabash, Ind., assignors to The General Tire and Rubber Company, Akron, Ohio, a corporation of Ohio Application April 9, 1945, Serial No. 587,356

1 Claim. (Cl. 287—85)

This invention relates to rubber articulated joints (including vibration absorbing mountings) of the type having two annularly spaced telescopically disposed rigid sleeves or joint members of metal, plastic or the like in spaced coaxial relation and united by a rubber sleeve which is radially compressed or longitudinally tensioned throughout the mass thereof.

Torsional joints, vibration absorbing mountings, or pivotal connections having coaxial tubular metal members or sleeves, separated by a tubular mass of rubber, have heretofore been proposed. In one type of such joints, the rubber is interposed between the joint member under pressure in the uncured state and with the aid of a suitable rubber-to-metal adhesive bonded to both the inner and outer coaxial members of the joint during subsequent curing operations so that any movement between the inner and outer joint members is taken up by deformation of the rubber. Such a torsional joint is not always desired for the reason that rubber, being cured or vulcanized in contact with the metal, is under no initial strain and the desirable properties and load-sustaining characteristics of rubber under initial compression are not therefore present in the joint.

Joints having coaxial members separated by rubber under a state of high compression have also been proposed and have more desirable characteristics than those in which the rubber is simply molded in contact with and bonded to the joint members. In the assembly of such rubber joints, a section of heavy walled rubber tubing is usually forced through a tapered space into the space between the inner and outer members so as to compress and elongate the rubber into frictional engagement with each of the members. It has been considered almost essential in such a method of assembly to have a lubricant of some sort applied to the sliding surfaces. Because of the presence of a lubricant or because the coefficient of friction between rubber under compression and the joint members is insufficient to prevent it, there is a tendency for the joint members to slip relative to the rubber when the joint is subjected to high torsional strain or to repeated excessive axial strain.

In order to decrease tendencies for creepage under excess axial strain of mounting members or connections having rubber under high radial compression, it has also been heretofore proposed to bond the rubber resilient material to the inner central metal member prior to assembly. A bonded rubber-to-metal joint was thus had between the rubber and the metal member of smallest radius. Upon assembly of the rubber and inner member of such joints however, the radius of rubber is greatly decreased and the length greatly increased so that in the completed joint only a small portion of the surface of the rubber in contact with the central member was in the completed joint. It has now been found that repeated axial vibration creates tendencies to creep at the rubber-to-metal interface of greatest diameter as well as at the interface of smaller diameter and it is this creepage rather than the resilient material that limits the maximum permissible loadings of the joints or mountings.

It is an object of the present invention to provide a rubber articulated joint or mounted member which is bonded over substantially the entire interfacial area between the resilient material and the member of smallest radius and which is bonded over a sufficiently large area of the rubber-to-metal interface of greatest diameter to prevent creepage under relatively high axial loadings.

It is another object of the present invention to provide mounting members or pivotal connections having rubber bonded to metal over the entire rubber-to-metal interface and under high radial compression.

It is another object of the present invention to provide a rubber articulated joint between two substantially annular and spaced telescoping members in which the rubber or rubberlike material is under substantial radial compression and longitudinal elongation, and in which the rubber is securely bonded to the coaxial metal members, so that the joint has the desirable characteristics of joints in which the rubber is molded in contact with and bonded to the metal members as well as those in which the rubber is under compression between the coaxial joint members.

It is another object to provide a rubber articulated joint between telescoping members in which the entire mass of rubber is under relatively uniform longitudinal tension due to radial compression and in which the rubber after deformation by radial compression is also bonded to at least one of the joint members throughout substantially its entire contact therewith, so that even under high torsional stress the relative movement between the inner and outer joints is entirely taken up by deformation or shear in the rubber.

It is another object to provide a method of making rubber articulated joints having rubber under radial compression between telescoping metal sleeves and in which the rubber is bonded to the metal members throughout its entire length.

It is another object to provide a method of making the rubber articulated joints wherein a lubricant need not be used in assembly.

These and other objects will be apparent from the following detailed description of the invention, as illustrated by the accompanying drawings, in which:

Figure 1 is a longitudinal view partly in section of apparatus and parts of a joint embodying the present invention showing the undeformed vulcanized tubular rubber section in position for incorporation within the outer sleeve of the joint;

Fig. 2 is an elevational view partly in section of members of a joint embodying the present invention and a portion of apparatus suitable for assembly of the joint, showing the rubber element within the outer joint member and the inner coaxial joint element in a position for insertion within the tubular opening of the rubber element;

Fig. 3 is an elevational sectional view through the parts of a joint showing said parts in assembled position and showing a portion of the apparatus used in the assembly of the joint;

Fig. 4 is a longitudinal sectional view through a torsional joint embodying the present invention;

Fig. 5 is a sectional view through a portion of a modified form of a joint or mounting member embodying the present invention showing the resilient material molded within the outer metal member bonded by vulcanization thereto and coated with a suitable thermoplastic adhesive having relatively low coefficient of friction;

Fig. 6 is an elevational sectional view through a completed joint or mounted member prepared from the portion of the joint of Fig. 5 by inserting an inner tubular member through the central opening thereof to cause radial compression of the resilient material and longitudinal radial expansion.

Figure 7:
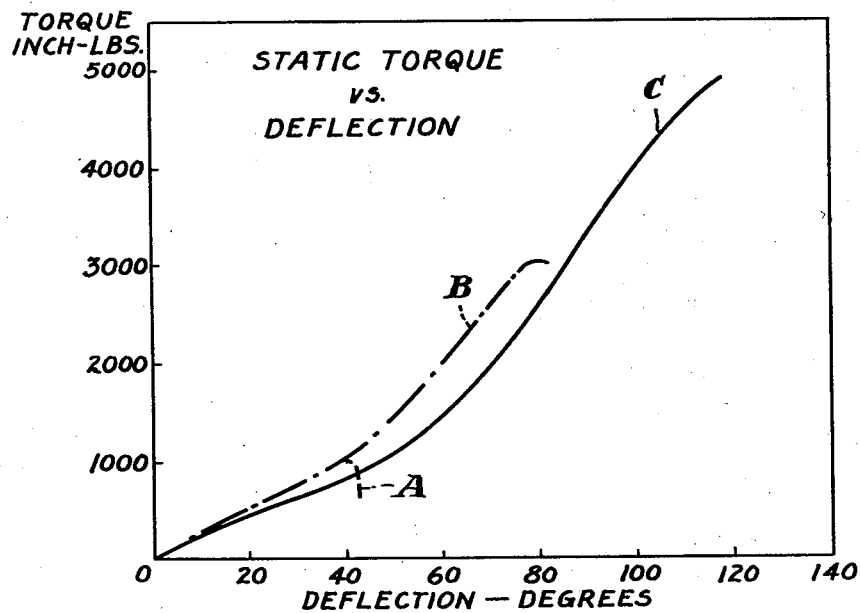
Figs. 7 and 8 show characteristic curves of mountings of identical size and shape, some embodying the present invention and some made entirely as heretofore proposed.

In joints utilizing rubber under a state of high radial compression the generally accepted principles governing adhesion of rubber to metal by vulcanization in contact with adhesive do not necessarily apply. For example the assembly of joints with rubber under strong radial compression or axial elongation, especially those having the rubber compressed more than 30 or 40 per cent is difficult without the use of lubricant which has been generally considered as preventing bonding operations. Furthermore, direct bonding to metal has required prolonged treatment at elevated temperatures which tend to relieve stresses in the rubber member and eliminate advantages of joints having rubber under radial compression. The difficulty of direct bonding of rubber to metal in joints having rubber under high radial compression between two coaxial members is recognized in the Thiry British Patent 461,478 of 1937. In accordance with this patent the outer metal member was lined with a bonded layer of rubber compound vulcanized in situ. There was no bonding or joining of the separately vulcanized rubber of the resilient member directly and rigidly to the metal but mere cementing of this member to other separately vulcanized resilient rubber that was previously adhered to the metal in the ordinary way, i. e. by vulcanization in contact with a rubber to metal adhesive applied to the surface of the metal.

We have found that a thermoplastic or thermosetting resin coating on the surface of the separately molded resilient material and preferably also on the surface of the metal or rigid member which is adapted to contact the separately molded surface of the annulus, may so greatly reduce the coefficient of friction between the rubber and metal parts of the joint during the assembly of the elements of a joint having rubber under high radial compression that the lubricating agents heretofore used can be eliminated without detriment. We have also found that we obtain by heating the rubber-to-metal interface to the softening point of the resin advantages heretofore sought for (but unobtained) in attempts to provide rubber to metal adhesion by processes similar to the customary processes of vulcanization in contact with the metal.

The resin coating applied to the resilient material and/or to the metal surprisingly need not be a rubber-to-metal adhesive, and if coatings are applied to both the metal members and the resilient material, the contacting coatings need not even be compatible to obtain the benefits of the invention. However, at least one of the contacting coatings, preferably the outer coating on the resilient material, should be heat-softenable or should pass through the thermoplastic state. The resin coating directly in contact with the rubber is preferably of a type which adheres strongly to rubber and if assembly is to made without a lubricant, the outer surface coating on the resilient material should have a coefficient of friction with the metal or the coated surfaces of the rigid members of less than .9 and coefficients of friction less than .6 are preferred.

We have found that a lubricant may be used, and the advantages of the heat softened film retained provided it is of a type that is completely absorbed. If a lubricant is used during assembly, the coefficient of friction between the resilient and rigid parts as they are to be assembled may be substantially higher than .9 which is about the limiting value permitting assembly without a lubricant. Only lubricants which are compatible with the coating on the rubber or the metal, or which are at least in small amounts compatible with the coating on the resilient member and the resilient material, should be used.

In general, the outer coating or film on the separately molded resilient member may be any hard film-forming resin base coating composition, it being found in general that hard filmforming resins have a coefficient of friction less than .9 between like coatings, between the coating and clean metal or even between the coating and resilient tread like rubber compounds of the resilient member and that they give the benefits above set forth. The resin in the coating composition may be either thermoplastic or thermosetting. If an absorbable lubricant is used, a hard film-forming material is not even necessary, but a hard to rubbery, even tacky heat-softenable film may be used.

If the hard film to be applied over the rubber or resilient member is not one that adheres to the rubber, it is usually preferable to apply directly on the rubber a material capable of adhering strongly to the rubber, for example, a composition drying to a tacky film or a rubber adhesive. Such materials include cements which are mixtures of rubber cement and a resin base composition, rubber to metal adhesives, and other materials capable of forming an adherent film to the rubber and also capable of adhering to the hard film-forming material superimposed thereon.

Examples of materials which may be applied over the rubber are film forming compositions having as a basic constituent, one or more of the heat-softenable (capable of passing into or through the heat softened state) phenol formaldehyde resins, including the rubber modified and the polyvinyl acetal (especially polyvinyl butyral) modified phenol aldehyde resins, rubber addition products such as rubber-chloride, vinyl resins including polyvinyl esters such as plasticized polyvinyl chloride, copolymers such for example as the copolymer of vinyl acetate and vinyl chloride, acrylic and methacrylic esters, relatively hard hydrocarbon resins, the alkyd resins including glycerol phthalate condensation products, condensation products of alpha-beta-unsaturated dicarboxylic acids with polyhydric alcohols, products prepared by polymerizing and/or condensing esters of unsaturated alcohols such as allyl and methallyl alcohols with saturated or unsaturated mono- or dicarboxylic acids, the amine aldehyde resins, including urea formaldehyde and melamine aldehyde, olefin sulfur dioxide resins, thermoplastic and thermosetting silicones, including the resinous reaction products of water and one or more organosilicon chlorides including the reaction product of water and alkyl or phenyl silicon chlorides having at least two chlorine atoms, rubber to metal adhesives such as the resinous exothermic reaction product of a mixture of rubber, a salt of a strong acid, a weak acid and water, a reaction product of rubber and para-toluene sulfonic acid, "Cycle-weld," which is a mixture of a modified phenol aldehyde resin and a rubber conversion product having less unsaturation than rubber, a modified phenol aldehyde resin as well as other resin base compositions.

The strongest rubber articulated joints having rubber under radial pressure are usually obtained when at least one of the films between the separately cured rubber member and the metal adjacent thereto contains a rubbery or rubberlike constituent as one ingredient and a heat-softenable resinous material (preferably thermosetting) as another ingredient. The rubbery ingredient may be a natural rubber, a rubber derivative or a rubbery polymer such as a polyvinyl acetal resin, a polyvinyl acetal modified phenolaldehyde being prepared by condensing two parts of a polyvinyl butyral resin with one part of a partially condensed phenolalcohol. The rubbery ingredient may act to provide interfacial resilience during the heating operation while the resinous constituent enters into adhesive contact with the opposing surfaces.

When a heat softenable coating, such for example as a composition having as a base thereof one or more of the above resins, is applied to the tubular or cylindrical surfaces of the rigid elements, the outer coating on the resilient material need not even be heat softenable as heat causes suitable coalescence of the films when but one of the two contacting films are heat softenable.

By providing heat plastic bondable hard setting coating on the resilient material and by treating the joint members after assembly at a suitable elevated temperature to cause softening of the coating composition or compositions so that a bond is produced between the rubber and metal, we have been able to provide joints that are capable of withstanding greatly increased permanent axial or torsional loads.

The heating period should be insufficient to cause relief of compressive strain in the resilient annulus. The minimum heating time is dependent upon the heat transfer medium, upon the temperature, and upon the method of heating. With higher temperatures or with liquids or metal as a heat transfer medium, or by the use of induction heating, the heating time may of course be relatively short as benefits of the present invention are obtained when the heating is only for a sufficient time to cause heat softening of the resinous film between the resilient material and the rigid or metal members. In general, it is found that a flash heating at non-destructive melting or softening temperature for the resin film may be used. Thus, heating from about five seconds to a minute in a hot air oven at a temperature of about 350 to 400° F. is usually entirely satisfactory.

In accordance with the preferred process of the present invention, the rigid members, which are preferably a metal such as steel are prepared by applying over that portion thereof that is adapted to contact the resilient annular member, a liquid resinous composition (solution or dispersion of a resinous material) capable of strongly adhering to metal. If the dried film from this composition has a coefficient of friction to rubber or the coated rubber greater than .9 a liquid compatible hard drying (preferably thermosetting) composition having a lower coefficient of sliding friction is then superimposed thereon to facilitate assembly. The resilient annular member is also coated with a coating composition capable of strongly bonding to rubber. After drying of the initial coating there is superimposed thereon a compatible composition, preferably thermoplastic, and having the characteristics of forming a firm film which may be hard or elastic and which has a low coefficient of friction between it and the metal or between it and the composition on the metal. The most desirable compositions for bonding directly to the metal as well as the most desirable compositions for bonding direct to the rubber often have a relatively higher coefficient of friction than will permit good assembly without a lubricant which is usually deleterious to the adhesion.

The elements of the joints or mountings thus prepared are then assembled together with the inner and outer members in coaxial relation and with the resilient material under radial compression whether that compression is obtained by axial compression or by deformation with subsequent axial elongation. The assembly, or preferably the rubber-to-metal interface thereof is heated at a temperature suitable for softening either the outer coating on the rubber or on the metal or both. Upon cooling of the joint a firmly bonded or mounted member is had.

Referring to the drawings wherein like parts are designated by like numerals of reference in the several views, the torsional joints or mounting members of the present invention comprise an outer joint element with a sleeve portion 1 which is preferably tubular shaped and which preferably has over its inner face at least one coating 2 of heat softening or heat setting resinous composition which adheres strongly to metal. An inner joint element 3 which may or may not have a coating 4 over its outer surface of a composition similar to that of the coating 2 of the outer joint element is disposed coaxially with the joint element 1 and is separated therefrom by the annular cured soft rubber or soft rubberlike material 5 which is under substantial radial compression and axial or longitudinal elongation.

The rubber 5 has a volume that preferably does not exceed the volume between the members 1 and 3 and prior to assembly carries a coating 6 over its entire outer surface or the surface to be bonded to metal. The coating 6 as aforementioned may be a single coating with a relatively low coefficient of friction to metal or to the inner surface of the coating 2 or may be composed of a plurality of superimposed coatings, the one in contact with the rubber 5 being one that strongly adheres to rubber and the outer superimposed coating being thermoplastic and being of a hard drying type which has low coefficient of friction and is compatible with the coating in contact with the surface or resilient member 5.

Referring especially to Figs. 1 to 4, inclusive of the drawings which illustrate the preparation of joints embodying the present invention, the annulus or tubular section 5 is prepared in vulcanized form having relatively thick walls. A section of suitable volume to substantially fill the space between the coaxial inner and outer sleeves of the joint members may be forced by downward movement of the plunger 7 through the tapered throat of the member 8 into the outer joint element 1 to a position such as that illustrated in Fig. 2, both members having the coatings above referred to applied over the interfacial surfaces.

The resilient member 5, such as rubber, is preferably larger in diameter than the internal diameter of the sleeve of the outer element 1 so that it is compressed and elongated substantially when it is forced within the outer element 1. After the rubber 5 is inserted in the outer element 1, the opening 9 has a considerably smaller diameter than the outer diameter of the sleeve portion 3 of the inner joint element which preferably has a generally cylindrical or curved outer surface. The inner sleeve 3, also having a coating 4 of hard heat-softenable resin previously applied thereto as above described, is then inserted in coaxial relation with the outer member 1 through the opening 9 of the resilient member 5.

After the assembly of the joint elements, the entire assembly or the metal thereof may be heated at elevated temperatures for a suitable period to cause bonding of the rubber 5 to the inner and outer metallic elements. In order to decrease adverse effects on the rubber or rubberlike material 5, it is preferred that the heating of the elements 1 and 3 be accomplished by a high frequency electric field or by passage of electric current or rapidly changing magnetic flux through the metal portions in contact with the rubber.

In the modification of Figs. 5 and 6, the resilient material 5a is molded and bonded by vulcanization within the outer joint element 1. Both the rubber and the metal, or the rubber only, may be given a plurality of coatings of one or more hard drying or hard setting resin base material which goes through a thermoplastic stage to produce the hard coating 6 having a relatively low coefficient of friction to metal, as above described. The inner joint member is then assembled as illustrated in Figs. 2 and 3.

By appropriate heating operations, the surface coatings on the metal and rubber may be coalesced together to produce a bonded mounting as illustrated in Fig. 6. If during the heating operations the interface between the inner member 3 and the resilient material 5a only is heated as by passage of current or rapidly changing magnetic flux through the member 3, on subsequent cooling a bond is produced over substantially the entire interfacial area between the central element 3 and the resilient member 5a. Only a portion of the interfacial area between the outer element and the resilient member is bonded. It is found that due to the relatively larger total area in contact with the outer member, such joints are especially advantageous for the reason that the resilient material may be more efficiently utilized.

By coating only the central portion of the outer cylindrical surface of the inner member with a material compatible with the outer coating on the resilient material and by utilizing as the outer coating on the resilient material a film of low coefficient of friction to metal but which does not itself bond to metal, a joint may be produced having only the central portion of the metal joint members bonded to the rubber. The end portions of one or both of the metal joint members may be prevented from adhering to the rubber by coating them with a non-adherent dry setting material such as a solution of gelatin or even water glass which does not readily adhere to the coated rubber but which permits dry assembly.

As mentioned above, when the assembly of the joint or mounting is to be made without a lubricant the coating in direct contact with the surface of the rubber may be any adhesive capable of bonding thereto, regardless of the coefficient of sliding friction between a surface thereof and the metal, provided a coating of relatively low coefficient of sliding friction is superimposed thereon. For a coating to be directly applied on the rubber, rubber-to-metal adhesives capable of bonding to rubber, cements containing synthetic resins in admixture with the rubber, or the like, are preferred. For assembly with a lubricant the coefficient of friction to metal or the coating on the rigid members may be high such as well above 0.9.

Examples of materials which are preferably used in direct contact with the rubber are: A rubber-to-metal adhesive designated hereinafter as "Phenolic E" and marketed by the Interlake Chemical Corporation as Resin 4162, it being a polyvinylacetal modified polyphenolalcohol resin; chlorinated rubber or else; a cyclized rubber prepared by reacting rubber with the salt of a strong acid, water and a weak acid; etc.

As the second coating over the rubber to reduce the coefficient of sliding friction, it is preferred to use a resin base coating capable of drying to a film having a low coefficient of sliding friction on the metal or coating thereon with which it is to come in contact. It is found that the coefficient of sliding friction between the coating on the annular rubber member and the metal should not exceed .9 to permit assembly of the parts together so that the annular member is under high radial compression. To facilitate assembly the coefficient of sliding friction between surfaces adapted to contact each other should be less than .5 or .6 and preferably should not substantially exceed .3.

It is usually preferred that the superimposed coatings be compatible with each other. However, it is found that even when the coating compositions from which the superimposed films or adjacent coatings are applied are not compatible, upon heat-softening sufficiently great interlocking of the coatings occurs to materially increase the load-sustaining properties of the joint or mounting above those produced in the ordinary way. Examples of outer coatings which are especially desirable are polyvinylbutyral modified phenol aldehyde resin and rubber chloride base coating compositions.

If a coating on the metal is used, rubber-to-metal adhesives as above described are also especially desirable, with or without a superimposed coating to reduce the coefficient of sliding friction with the coated annular member. As an outer coating on the metal, a hard film from a coating composition having as a base thereof the above vinyl butyral or vinyl acetal modified phenol aldehyde resin is especially desirable.

Although the coating compositions applied over the surfaces of the metal members or of the rubber members need not be compatible themselves, it is desirable that the films formed from solutions or dispersions be sufficiently compatible to interlock or interdiffuse when they are heated to or through the thermoplastic state.

Figure 8:
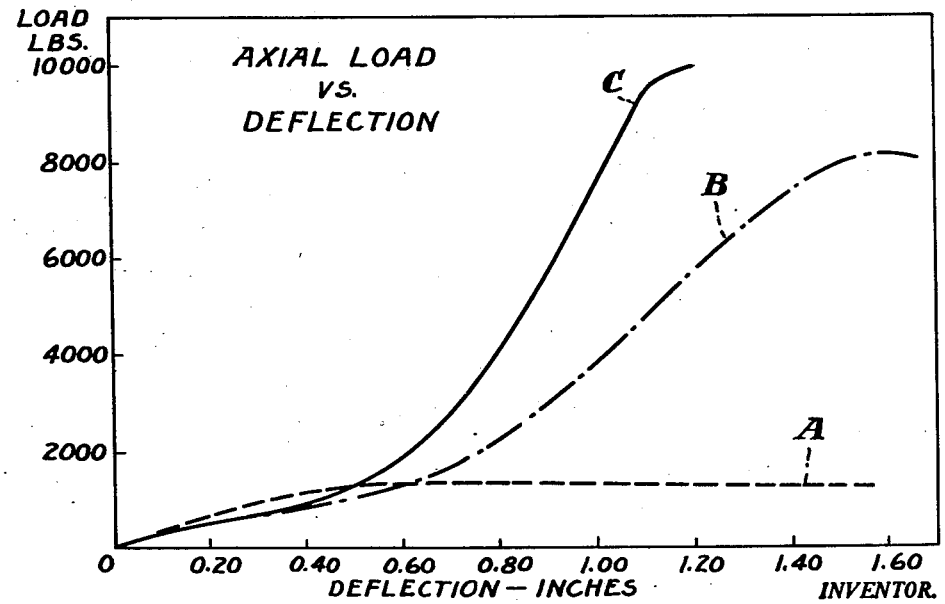

Figs. 7 and 8 of the accompanying drawings illustrate the improved operation of mountings or joints prepared in accordance with the present invention. In Fig. 7, static torque is plotted against deflection and in Fig. 8 the axial load is plotted against deflection. In the graphs, the curve A represents the deflection curve of a mounting or joint, prepared in conventional manner, using a petrolatum lubricant. Curves B are the load deflection curves of a mounting of identical size and shape, but having the metal coated only with a dried film deposited from a 35% solution in ethanol of a polyvinyl butyrol modified phenolic resin ("Phenolic D"). The coefficient of sliding friction between an untreated soft vulcanized rubber compound and a film of "Phenolic D" resin deposited on sand blasted metal was .85. The rubber insert in the mounting was coated prior to assembly successively with a dried film deposited from solution of a polyvinyl acetal modified polyphenolalcohol rubber-to-metal adhesive ("Phenolic E") having a coefficient of friction too high for assembly operations (greater than .9), and then with a solution of "Phenolic D" to form a superimposed film having a low coefficient of sliding friction to the coated rubber. Curves C are the load deflection curves of still another mounting of identical size and shape having both the rubber and metal members coated successively prior to assembly with solutions in volatile solvent of "Phenolic E" and "Phenolic D" resins, each coating being allowed to dry before the latter is applied. It will be seen from Figs. 7 and 8 that the load at which failure of the mounting occurred and the load where increased deflection occurred without an increase in load is many times greater in the case of mountings B and C than in the case of mounting A prepared by the process heretofore used.

Solutions or dispersions of one or more other resins, such as those above set forth may be substituted for one or more of the phenolic resins in the mountings or joints above described, provided in case assembly is to be made without a lubricant, care is had to utilize as an outer coating on the resilient member and/or upon surfaces of the metal members a coating which has a relatively low coefficient of sliding friction with the surface against which it is to be assembled. If a liquid lubricant is desired during assembly it should be compatible with the rubber like material of the annular member and with one or both of the films so as to be absorbed during the heating period. Mineral oil, higher boiling esters such as dibutyl phthalate and di-(2-ethyl hexyl) phthalate are examples of materials useful in this manner. Dilute solutions in a volatile or non-volatile solvent of these materials or in other relatively non-volatile oily materials are preferred. Solutions of partial polymers of unsaturated materials such as partially polymerized styrene, methyl acrylate, etc. and capable of being further polymerized by heat treatment may also be used if desired.

The surfaces of the metal may be roughened as by sand blasting, annodizing etc. or they may be treated with any desirable surface treatments such as the well-known "Parkerizing treatment" which consists in phosphatizing a clean surface of the metal and successively rinsing the thus treated surface with water and a chromic acid solution.

In the claim the terms "generally tubular" and "generally cylindrical" are used in the generic sense to include irregular shapes.

Furthermore, it is to be understood that the particular form of product shown and described, and the particular procedure set forth, are presented for purposes of explanation and illustration and that various modifications of said product and procedure can be made without departing from any invention as defined in the appended claim.

What we claim is:

A mounting or joint having an outer rigid member with a generally tubular portion, an inner rigid member with a generally cylindrical portion in substantially coaxial relation within said tubular portion, a separately cured intervening annulus of a rubber compound separating said portions, said annulus being maintained under substantial radial compression and axial elongation by said portions, a hardened film comprising a plurality of superimposed layers comprising a resin disposed on the surface of said annulus and separating said annulus from said rigid members, unexposed portions of said film rigidly uniting said annulus to said rigid members as when said film has passed through the sofetened stage after assembly of said members and said annulus, said annulus being under strong radial compression against said portions, said mounting or joint being further characterized by having a greater resistance to slippage than has a joint or mounting of identical size and composition but without said film.

JOHN H. KELLY, Jr.
ROSALIND M. GLASSCO.

REFERENCES CITED

The following references are of record in the file of this patent:

UNITED STATES PATENTS

| Number | Name | Date |
| --- | --- | --- |
| 1,778,197 | Lord | Oct. 14, 1930 |
| 1,961,536 | Thiry | June 5, 1934 |
| 2,078,910 | Merrill | Apr. 27, 1937 |
| 2,128,635 | Charch | Aug. 30, 1938 |
| 2,386,112 | Harkins | Oct. 2, 1945 |

FOREIGN PATENTS

| Number | Country | Date |
| --- | --- | --- |
| 461,478 | Great Britain | Feb. 17, 1937 |